United States Patent
Karl

[19]

[11] Patent Number: 5,896,750
[45] Date of Patent: Apr. 27, 1999

[54] DEVICE FOR THE AIR CONDITIONING OF A VEHICLE WHEN RUNNING AND PARKED

[75] Inventor: Stefan Karl, Paris, France

[73] Assignee: Valeo Climatisation, La Verriere, France

[21] Appl. No.: 08/570,247

[22] Filed: Dec. 11, 1995

[30] Foreign Application Priority Data

Dec. 9, 1994 [FR] France .................................. 94 14871

[51] Int. Cl.$^6$ ...................................................... B60H 1/32
[52] U.S. Cl. .............................................. 62/236; 62/244
[58] Field of Search .............................. 62/236, 239, 244

[56] References Cited

U.S. PATENT DOCUMENTS

| | | | |
|---|---|---|---|
| 2,286,316 | 6/1942 | Snook | 62/205 |
| 2,467,398 | 4/1949 | Miller | 62/236 |
| 2,962,873 | 12/1960 | Anderson | 62/236 |
| 2,972,056 | 2/1961 | Park et al. | 290/4 R |
| 3,230,381 | 1/1966 | Grinnell et al. | 290/4 R |
| 3,545,222 | 12/1970 | Petranek | 62/236 |
| 3,646,773 | 3/1972 | Falk et al. | 62/236 |
| 3,720,842 | 3/1973 | Martin et al. | 307/68 |
| 3,844,130 | 10/1974 | Wahnish | 62/133 |
| 3,941,012 | 3/1976 | Mayer | 62/236 |
| 4,051,691 | 10/1977 | Dawkins | 62/236 |
| 4,280,330 | 7/1981 | Harris et al. | 62/236 |
| 4,679,090 | 7/1987 | Baker et al. | 290/4 R |
| 4,910,414 | 3/1990 | Krebs | 290/4 D |
| 4,947,657 | 8/1990 | Kalmbach | 62/236 |
| 5,105,096 | 4/1992 | Waldschmidt et al. | 307/68 |
| 5,125,236 | 6/1992 | Clancey et al. | 62/236 |
| 5,249,429 | 10/1993 | Hanson | 62/86 |
| 5,361,593 | 11/1994 | Dauvergne | 62/89 |

FOREIGN PATENT DOCUMENTS

| | | |
|---|---|---|
| 2690387 | 10/1993 | France . |
| 985435 | 3/1965 | United Kingdom . |

*Primary Examiner*—William E. Tapolcai
*Attorney, Agent, or Firm*—Morgan & Finnegan, LLP

[57] ABSTRACT

The compressor (3) of the refrigerating fluid circuit is driven by the thermal engine (1) of the vehicle when the latter is functioning and, when parked, by the alternator (2). The latter, fed with three-phase current from an auxiliary battery (10) so as to function as a motor, and the compressor (3), are then disconnected from the crankshaft (20) by a free-wheel mechanism (7). The preliminary air conditioning of the vehicle when parked is thus provided without a special electric motor for driving the compressor, with reduced expenditure of energy by virtue of the feeding of the alternator with three-phase current, and without any risk of exhaustion of the main battery by virtue of the auxiliary battery (10).

9 Claims, 1 Drawing Sheet

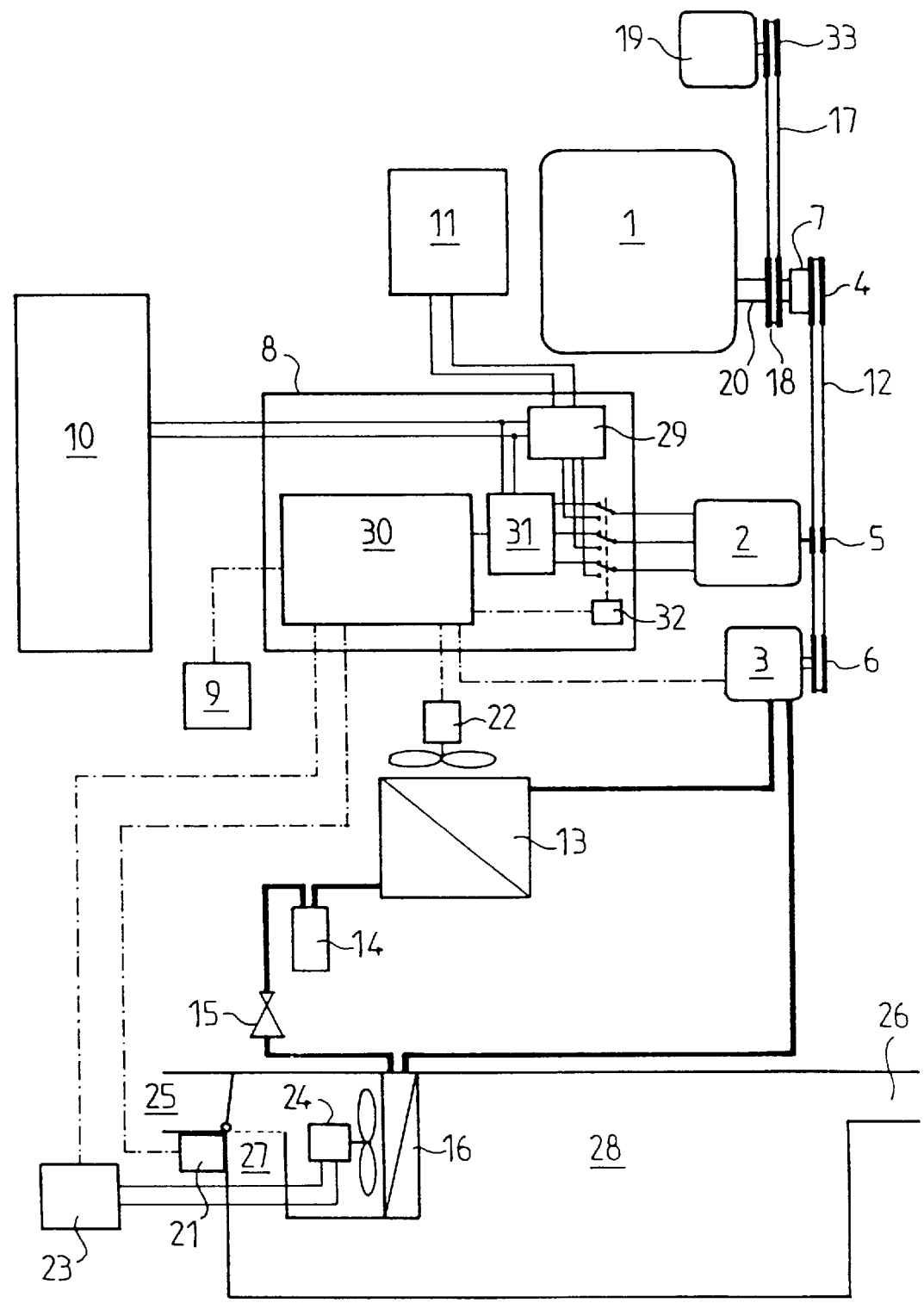

DEVICE FOR THE AIR CONDITIONING OF A VEHICLE WHEN RUNNING AND PARKED

FIELD OF THE INVENTION

The invention concerns an air conditioning device for the passenger compartment of a motor vehicle comprising means for conveying an air flow into the compartment, and the like.

BACKGROUND OF THE INVENTION

When the air is very hot in the passenger compartment of a stationary vehicle, an air conditioner reduces it to a more acceptable temperature before the occupants of the vehicle take their places, as disclosed for example in FR-A-2 690 387.

In a known device of this type, notably for a vehicle with a thermal engine, the compressor is driven by a special electric motor both when the main engine is working and when the vehicle is parked. This electric motor has a relatively high energy consumption. Moreover, when parked, the device is fed by the on-board battery of the vehicle. If the device is used for a long time under these conditions, the battery runs the risk of being discharged to the point of no longer allowing the starting up of the thermal engine.

BRIEF SUMMARY OF THE INVENTION

The aim of the invention is to provide a simpler device than the known device.

Another aim is to reduce the electrical consumption of the device when parked.

Another aim finally is to prevent the use of the device leading to the exhaustion of the on-board battery of the vehicle.

The invention concerns an air conditioner that has a compressor and provides that the compressor is driven by the main engine when the latter is working and by the alternator, supplied with electricity so as to function as a motor, when the vehicle is parked. The electric motor to drive the compressor is thus eliminated, which simplifies the device.

Optional characteristics of the device according to the invention, complementary or alternative, are set out below:

The alternator rotates in the same direction when it is driven by the main engine and when it functions as a motor, and the alternator and compressor are joined together to rotate with a rotary component itself coupled to the main engine by a unidirectional transmission in order as to be driven by the main engine when the latter is working and so as not to drive the main engine when the alternator functions as a motor.

The alternator is fed with a three-phase current to function as a motor. This method of supply gives a saving in energy compared to the single-phase current supply of the motor of the known device.

It comprises a switch enabling the alternator to be connected either to a regulator to receive the current which it produces, or to control devices to supply it as a motor.

It comprises control devices for the supply of the alternator as a motor able to rotate the latter at variable speed.

It comprises an auxiliary battery of accumulators independent of the main battery of the vehicle, the electrical supply of the device when the vehicle is parked being provided exclusively by the auxiliary battery. In these conditions, the prolonged use of the device when parked brings about the exhaustion of the auxiliary battery. The device then ceases to function, but the main battery remains available to provide the supply to the essential equipment of the vehicle, and particularly its starter. The auxiliary battery can be recharged, as can the main battery, by the alternator when the main engine is working.

The auxiliary battery has a higher nominal voltage than the main battery, for example a voltage of 48 V instead of 12 V, facilitating the supply of the alternator.

The auxiliary battery is connected to components which play no part in the air conditioning and function at the higher voltage.

BRIEF DESCRIPTION OF THE DRAWING

The characteristics and advantages of the invention will be shown in greater detail in the description below, with reference to the accompanying drawing, in which the single figure depicts a functional diagram of the device according to the invention associated with the thermal engine of a motor vehicle.

DETAILED DESCRIPTION

The device illustrated comprises a conventional refrigerating fluid circuit including a compressor 3, a condenser 13, a fluid reservoir 14, an expansion valve 15 and an evaporator 16, associated with powered fans 22 and 24 intended to produce air flows in a heat exchange with the condenser 13 and evaporator 16 respectively. In the example shown, the air flow produced by the powered fan 24 and cooled by the evaporator 16 is conveyed into the passenger compartment 28 of the vehicle when it is wished to reduce the temperature therein. A pivoting flap 21 allows air to be drawn in by the powered fan 24, coming either from outside the vehicle through an inlet 25, or from the passenger compartment itself through a recirculation duct 27. In the first instance, an outlet 26 allows the evacuation of air from the passenger compartment to the exterior In a known manner, a control circuit 30, linked to a control panel 9 placed on the fascia of the vehicle, controls the working parameters of the air conditioning device, notably the engagement of the compressor 3, the position of the flap 21 and the supply to the powered fans 22 and 24, the latter by means of a speed variator 23.

A pulley 6 mounted on the shaft of the compressor 3 is coupled to two other pulleys 4 and 5 by a belt 12. The axes of the three pulleys being parallel and not coplanar, the belt runs for example in the form of a triangle The pulley 4 is mounted on the crankshaft 20 of the thermal engine 1 by means of a free-wheel mechanism 7 which enables the pulley to be driven by the engine 1 when the latter is working. The alternator 2 of the vehicle, on the shaft of which is mounted the pulley 5, and the compressor 3 are therefore driven by means of the belt 12. In a known manner, the alternator 2 produces a three-phase current which is rectified and regulated by a regulator 29 to supply the electrical circuit 11 of the vehicle, which comprises an on-board battery serving notably for starting the engine 1.

According to the invention, the alternator 2 can also be supplied in such a way as to function as a motor, by means of an auxiliary battery 10, the control circuit 30, a converter 31 enabling the frequency of a three-phase current to be varied and a switch 32, these last three components being grouped together with the regulator 29 in an electronic box 8. The battery 10, which is also charged by the alternator 2, through the regulator 29, when the motor 1 is working, provides a current which is converted by the converter 31 into a three-phase alternating current adapted to the supply of the alternator 2. The three-phase switch 32 enables the alternator to be connected either to the regulator 29 when the motor 1 is working, or to the converter 31 for the alternator to function as a motor.

To this end, the circuit 30 sends to the converter 31 and to the switch 32 the commands enabling the alternator to function as a motor, so that it rotates in the same direction as when it is driven by the engine 1. The compressor 3 is then driven in a normal manner by means of the belt 12. The free-wheel mechanism 7 allows the pulley 4 to rotate in the direction of rotation of the crankshaft 20 even though the latter is immobile. Advantageously, the converter 31, under the control of the circuit 30, allows regulation of speed of the alternator so as to adapt the energy consumption of the latter and the power of the refrigerating fluid circuit according to requirements.

The reference 19 designates an auxiliary appliance driven by the engine 1 by means of a belt 17 in contact with the pulleys 18 and 33 which are fixed respectively to the crankshaft 20 and to the shaft of the appliance 19. Several such appliances can be provided, such as a pump for a coolant liquid and a hydraulic pump.

Preferably, the auxiliary battery 10 has a nominal voltage higher than the main starter battery, these two voltages being for example 48 V and 12 V respectively.

When the engine 1 rotates, the device according to the invention functions in the manner of a conventional air conditioning device, except that the auxiliary battery 10 is recharged, or maintained in the charged state, at the same time as the main battery.

The device can moreover be programmed to come into action at a given time when the vehicle is parked. The programming can be carried out, before leaving the vehicle, by means of programming keys provided on the control panel 9. It is also possible to activate the device by remote control. These two possibilities may be combined, the remote control signal effecting programming which triggers in its turn the activation of the device at a chosen time.

When the vehicle is parked in sunshine, the functioning of the device according to the invention includes advantageously a first phase intended to replace the warm air contained in the passenger compartment with external air, as described in FR-A-2 690 387. This renewal of the air is obtained by the action of the powered fan 24, the flap 21 being in the position where the air inlet 25 is open and the recirculation duct 27 is closed. In this first phase, the alternator 2 is not supplied and the refrigerating fluid circuit is not in use.

When the air in the passenger compartment has been reduced approximately to the external temperature, the control circuit 30 triggers the supply to the alternator 2, which drives the compressor 3 so as to permit the reduction of the air temperature in the passenger compartment to a level below the external temperature. Advantageously, the inlet 25 is then closed and the duct 27 opened by the flap 21. Just as in its functioning when being driven, a set temperature may be chosen, which is to be achieved and then maintained thanks to the device.

The auxiliary battery 10 can be used, independently of the air conditioning, to supply the components functioning at this higher voltage, for example for the electric heating of the windscreen, the seats or the passenger compartment with for example electric radiators serving as auxiliary heating.

What is claimed is:

1. An air conditioning device for the passenger compartment of a motor vehicle having a main drive engine, means for conveying an air flow into the compartment, and a compressor suitable for circulating a refrigerating fluid in a circuit having an evaporator for transferring heat from the air flow to the refrigerating fluid, means being provided to rotate the compressor when the main drive engine of the vehicle is working and also when the vehicle is parked, an alternator driven by the main engine to produce electricity, the compressor being driven by the main engine when the main engine is working wherein the invention is characterized by the alternator comprising an electric motor when the vehicle is parked and at least one auxiliary battery in the motor vehicle for supplying electricity to said electric motor.

2. A device according to claim 1, further comprising the alternator being able to rotate in the same direction when the alternator is driven by the main engine and when the alternator functions as an electric motor, a rotary component for rotation with the alternator and the compressor, and a unidirectional transmission coupled to the main engine and to said rotary component to be driven by the main engine when the main engine functions and to avoid driving the main engine when the alternator functions as said motor.

3. A device according to claim 1, wherein the alternator functioning as said motor is a three-phase current motor.

4. A device according to claim 1, wherein the device comprises a regulator, control devices, and a switch for selectively coupling the alternator to said regulator to receive current from the alternator and to said control devices to supply current to the alternator as said motor.

5. A device according to claim 1, wherein the device comprises control devices to drive the alternator as a variable speed motor.

6. A device according to claim 1, further comprising a main vehicle battery, said auxiliary battery being separate and independent of said main vehicle battery, said auxiliary battery being the exclusive supply of electricity said electric motor when the vehicle is parked independent of said main vehicle battery.

7. Device according to claim 6, characterised in that the auxiliary battery has a higher nominal voltage than the main battery.

8. A device according to claim 7 wherein the auxiliary battery is connected to components that are separate from the air conditioning and which function at said higher voltage.

9. A device according to claim 2, wherein the alternator is supplied with three-phase current in order to function as said motor.

* * * * *